United States Patent [19]

Bermes et al.

[11] Patent Number: 5,531,797
[45] Date of Patent: Jul. 2, 1996

[54] AQUEOUS DYE PREPARATIONS CONTAINING COUMARIN DYES

[75] Inventors: Rudolf Bermes; Walter Breitschaft, both of Ludwigshafen, Germany

[73] Assignee: BASF Aktiengesellschaft, Ludwigshafen, Germany

[21] Appl. No.: 398,767

[22] Filed: Mar. 6, 1995

[30]     Foreign Application Priority Data

Mar. 7, 1994 [DE] Germany .......................... 44 07 496.4

[51] Int. Cl.$^6$ ................ D06P 3/60; D06P 1/40; C09B 7/02
[52] U.S. Cl. ................ 8/648; 8/692; 8/919; 544/287
[58] Field of Search ................ 8/648, 692, 919, 8/527; 544/287

[56]         References Cited

U.S. PATENT DOCUMENTS

| | | |
|---|---|---|
| 2,926,116 | 2/1960 | Kein . |
| 3,617,210 | 11/1971 | Dehnert .................... 8/178 |

FOREIGN PATENT DOCUMENTS

| | | |
|---|---|---|
| 0022066 | 1/1981 | European Pat. Off. . |
| 0030337 | 6/1981 | European Pat. Off. . |
| 0146000 | 6/1985 | European Pat. Off. . |
| 2132680 | 11/1972 | France . |
| 1802863 | 7/1970 | Germany . |
| 2006517 | 8/1971 | Germany . |
| 2434816 | 2/1976 | Germany . |
| 3044128 | 7/1982 | Germany . |
| 3613651 | 11/1986 | Germany . |

*Primary Examiner*—Margaret Einsmann
*Attorney, Agent, or Firm*—Oblon, Spivak, McClelland, Maier & Neustadt

[57]             ABSTRACT

Aqueous dye preparations contain from 12 to 30% by weight, based on the weight of the preparation and calculated as free acid, of a dye of the formula

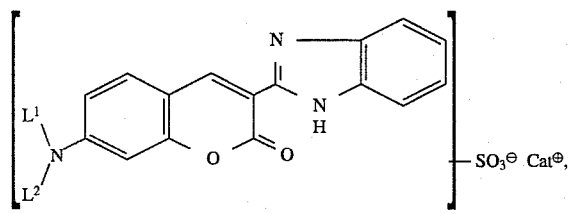

where $L^1$ and $L^2$ are each $C_1$–$C_4$-alkyl and Cat$^⊕$ is an alkali metal ion or an unsubstituted or substituted ammonium ion, and are used for coloring paper stocks.

9 Claims, No Drawings

AQUEOUS DYE PREPARATIONS CONTAINING COUMARIN DYES

The present invention relates to novel aqueous dye preparations containing from 12 to 30% by weight, based on the weight of the preparation and calculated as free acid, of a coumarin dye of the formula I

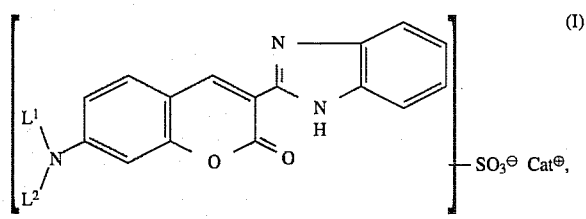

where
$L^1$ and $L^2$, independently of one another, are each $C_1$–$C_4$-alkyl and $Cat^{\oplus}$ is an alkali metal ion or an ammonium ion of the formula

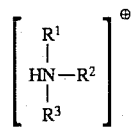

where $R^1$, $R^2$ and $R^3$, independently of one another, are each hydrogen, $C_1$–$C_4$-alkyl or $C_2$–$C_4$-hydroxyalkyl, their use for coloring paper stocks and a process for coloring paper stocks.

DE-B-1 802 863 discloses 3-(benzimidazol-2'-yl)-7-dialkylaminocoumarinsulfonic acids and sodium salts thereof and the use of these dyes for coloring textiles. Furthermore, DE-A-2 006 517 discloses special ammonium salts of these coumarinsulfonic acids and also aqueous solutions of some of said acids.

It is an object of the present invention to provide novel aqueous dye preparations which contain, as colorants, sulfonated coumarin dyes and which have a long shelf life. The novel dye preparations should give brilliant fluorescent hues when used.

We have found that this object is achieved by the dye preparations defined at the outset.

All alkyl groups occurring in the abovementioned formulae may be either straight-chain or branched.

$L^1$, $L^2$, $R^1$, $R^2$ and $R^3$ are, for example, methyl, ethyl, propyl, isopropyl, butyl, isobutyl, sec-butyl or tert-butyl.

$R^1$, $R^2$ and $R^3$ are furthermore, for example, 2-hydroxyethyl, 2- or 3-hydroxypropyl, 1-hydroxyprop-2-yl or 2- or 4-hydroxybutyl.

Preferred dye preparations are those which contain a coumarin dye of the formula I, where $L^1$ and $L^2$ are each ethyl.

Other preferred dye preparations are those which contain a coumarin dye of the formula I, where $Cat^{\oplus}$ is a lithium, sodium or potassium ion, in particular a sodium ion.

Further components of the aqueous dye preparations may be, for example, water-miscible organic solvents, such as glycols, alkyl ethers of glycols, γ-butyrolactone, N,N-dimethylformamide or N-methylpyrrolidone, solubility improvers, such as urea or ε-caprolactam, preservatives or salts.

The amount of these components is, as a rule, from 0 to 15, preferably from 0 to 10, in particular from 0 to 5, % by weight, based in each case on the weight of the preparation.

Of course, the sum of the individual components of aqueous dye preparations is 100% by weight in each case.

Aqueous dye preparations which contain from 12 to 25, in particular from 15 to 25, % by weight, based in each case on the weight of the preparation and calculated as free acid, of coumarin dye are preferred.

The novel dye preparations can be obtained in a manner known per se. For example, the free coumarin sulfonic acids, which can be prepared by the method described in DE-A-1 802 863, in aqueous solution can be reacted with the corresponding alkali metal hydroxide (or an aqueous solution thereof) or an amine and if necessary mixed with the further components.

The novel aqueous dye preparations are advantageous for coloring paper stocks.

We have also found that paper stocks can advantageously be colored using an aqueous liquor which contains a coumarin dye of the formula I

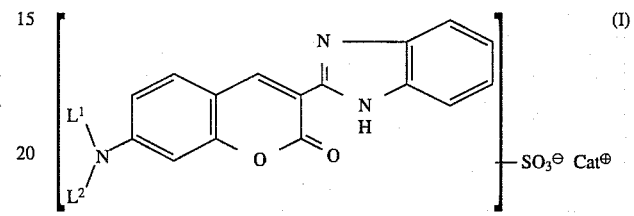

where
$L^1$ and $L^2$, independently of one another, are each $C_1$–$C_4$-alkyl and $Cat^{\oplus}$ is an alkali metal ion or an ammonium ion of the formula

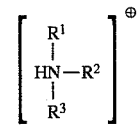

where $R^1$, $R^2$ and $R^3$, independently of one another, are each hydrogen, $C_1$–$C_4$-alkyl or $C_2$–$C_4$-hydroxyalkyl.

Wet-end coloring or surface coloring of paper, in particular for sized or unsized grades based on wood-free, wood-containing or wastepaper-containing raw materials, may be mentioned in particular. The assistants usually used in paper coloring and papermaking may be present.

Wet-end coloring or surface coloring of bleached or unbleached pulp of various origins, such as softwood or hardwood sulfite and/or sulfate pulp, with wet-end or surface addition, is preferred. Coloring by the spray, immersion or size press method are examples of surface coloring, where the paper is colored before reaching the drying section.

In wet-end coloring, the dyes of the formula I are preferably used in the presence of fixing agents, in particular of cationic fixing agents.

Suitable cationic fixing agents are derived from, for example, the following products:
A) homopolymers of diallyldimethylammonium chloride and copolymers of diallyldimethylammonium chloride with acrylamide and/or methacrylamide, whose K value is at least 30,
B) homopolymers of vinylimidazoles and copolymers of vinylimidazoles with acrylamide and/or methacrylamide, which, if necessary, have been reacted with epichlorohydrin,
C) homopolymers of vinylimidazoline and copolymers of vinylimidazoline with acrylamide and/or methacrylamide,
D) copolymers which contain polymerized vinylamine units,
E) copolymers of acrylamide with ($C_1$–$C_4$-dialkylamino)-$C_1$–$C_4$-alkyl acrylates and/or methacrylates,
F) polyethyleneimines and polyamidoamines,
G) condensates of formaldehyde, dicyandiamide and, if required, urea, H) condensates of melamine and formaldehyde,
I) polycondensates of epichlorohydrin and dimethylamine or
K) polycondensates of adipic acid and polyamines.

Cationic fixing agents of the abovementioned class (A) are conventional homopolymers of diallyldimethylammonium chloride and copolymers of diallyldimethylammonium chloride with acrylamide and/or methacrylamide. The copolymerization can be carried out using any ratio of the monomers. The K value of the homo- and copolymers of diallyldimethylammonium chloride is at least 30, preferably from 95 to 180.

Cationic fixing agents of the abovementioned class (B) are conventional homopolymers of vinylimidazole of the formula II

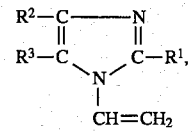

(II)

where $R^1$, $R^2$ and $R^3$, independently of one another, are each hydrogen or methyl and $R^1$ may furthermore be $C_2$–$C_4$-alkyl, and water-soluble copolymers of
a) at least 10% by weight of a vinylimidazole of the formula II,
b) up to 90% by weight of a acrylamide and/or methacrylamide and, if required,
c) up to 30% by weight of acrylonitrile, methacrylonitrile, vinyl acetate, vinylpyrrolidone, an ethylenically unsaturated $C_3$–$C_5$-carboxylic acid or esters thereof, the homo- and copolymers having been reacted, if necessary, with epichlorohydrin in a ratio of from 0.02 to 2.0 mole equivalents of epichlorohydrin per mole of basic nitrogen.

Cationic fixing agents of the class (B) are described, for example, in EP-A-146 000.

Cationic fixing agents of the abovementioned class (C) are conventional homopolymers of vinylimidazoline of the formula III

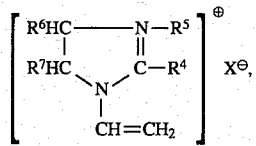

(III)

where $R^4$ is hydrogen, $C_1$–$C_{18}$-alkyl or a radical

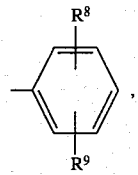

where $R^8$ and $R^9$, independently of one another, are each hydrogen, $C_1$–$C_4$-alkyl or chlorine, $R^5$ is hydrogen, $C_1$–$C_{18}$-alkyl, benzyl or

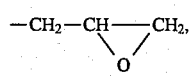

$R^6$ and $R^7$ independently of one another, are each hydrogen or $C_1$–$C_4$-alkyl and $X\beta$ is an anion, preferably chloride, bromide, sulfate, methosulfate, ethosulfate or carboxylate, and water-soluble copolymers which contain, as polymerized units,
a) at least 1% by weight of a compound of the formula II and
b) acrylamide and/or methacrylamide,
the K value of the homo- and copolymers being from 50 to 250.

Cationic fixing agents of the class (C) are described, for example, in DE-A-3 515 086.

Cationic fixing agents of the abovementioned class (D) are conventional copolymers which contain polymerized vinylamine units and are obtained by copolymerization of
a) from 95 to 10 mol % of N-vinylformamide with
b) from 5 to 90 mol % of an ethylenically unsaturated monomer selected from the group consisting of vinyl acetate, vinyl propionate, $C_1$–$C_4$-alkyl vinyl ethers, N-vinylpyrrolidone and esters, nitriles and amides of acrylic acid and methacrylic acid,
and subsequent elimination of from 30 to 100 mol % of the formyl groups from the copolymer.

Cationic fixing agents of the class (D) are described, for example, in EP-A-216 387.

Cationic fixing agents of the abovementioned class (E) are conventional copolymers of acrylamide and from 10 to 90, preferably from 30 to 70, % by weight of ($C_1$–$C_4$-dialkylamino)-$C_1$–$C_4$-alkyl acrylates and/or methacrylates.

Cationic fixing agents of the abovementioned class (F) are conventional polyethyleneimines which are obtained by polymerization of ethyleneimine in aqueous solution in the presence of acidic catalysts. In 10% strength by weight aqueous solution at a pH of 7, they have a viscosity of from 5 to 100, preferably from 10 to 40, mPa.s (measured at 20° C. in a rotational viscometer at 20 rpm). The polymers can be neutralized with organic acids, such as formic acid, acetic acid or propionic acid, or with inorganic acids, such as hydrochloric acid, sulfuric acid or phosphoric acid.

Other examples are polyamidoamines which are crosslinked with epichlorohydrin. Suitable products of this type are disclosed, for example, in U.S. Pat. No. 2,926,116. They are prepared by subjecting a dicarboxylic acid, such as adipic acid, to a condensation reaction with a polyamine, eg. diethylenetriamine or tetraethylenepentamine, and crosslinking the resulting resin with epichlorohydrin to such an extent that the resulting reaction products are still water-soluble. In 10% strength by weight aqueous solution at 20° C., these polymers have a viscosity of from 20 to 200 mPa.s (measured using a rotational viscometer at 20 rpm and 20° C., at a solids content of 10% by weight in water).

This group of cationic polymers includes polyamidoamines which are grafted with ethyleneimine and crosslinked with epichlorohydrin or, according to DE-A-2 434 816, with reaction products which are obtained by reacting the terminal OH groups of polyalkylene oxides having from 8 to 100 alkylene oxide units (preferably polyethylene oxides) with at least equivalent amounts of epichlorohydrin. The viscosity of the crosslinked, water-soluble products grafted with ethyleneimine is from 300 to 2500 mPa.s (measured using a rotational viscometer at 20 rpm and 20° C., at a solids content of 10% by weight in water).

Cationic fixing agents of the abovementioned class (G) are conventional condensates of formaldehyde, dicyandiamide and, if required, urea, which have a molar ratio of dicyandiamide:urea:formaldehyde of from 1:0.3 to 3:2:5.

The abovementioned K value of the polymers was determined in each case according to H. Fikentscher, Cellulosechemie 13 (1932), 58–64 and 71–74, at 25° C. in 5% strength by weight aqueous sodium chloride solution and at a polymer concentration of 0.5% by weight; $K=k \cdot 10^3$.

The cationic fixing agents may be used in an amount of from 0.05 to 5, preferably from 0.1 to 1.5, % by weight, calculated in each case as solid and based on the dry paper pulp to be colored.

The dyes of the formula I may be used in an amount of from 0.01 to 1.5, preferably from 0.01 to 1.0, % by weight, based in each case on the dry paper pulp to be colored and the pure dye.

The stated fixing agents may be added to the paper pulp to be colored either before or after the addition of the dyes. The pH of the dye liquor may be from 4 to 9, preferably from 6 to 8.

The novel dye preparations give dyeings in brilliant fluorescent yellow hues which have good performance characteristics. The fact that the fluorescence of the coumarin dyes of the formula I is not extinguished is particularly noteworthy.

The paper dyeings obtained using the novel dye preparations and by means of the novel process can be very readily oxidatively and reductively bleached, which is an important advantage with regard to the reuse of colored waste and/or waste paper for a chemical bleaching procedure (for example in the deinking proces).

The examples which follow illustrate the invention. Parts are by weight.

EXAMPLE 1

333 g of 3-(benzimidazol-2'-yl)-7-diethylaminocoumarin were sulfonated as described in the example of DE-B-1 802 863 or U.S. Pat. No. 3,617,210. The sulfonation product was precipitated by stirring into water, filtered off and washed substantially acid-free with water. 1073 g of a filter cake which had a solids content of 39.6% were obtained.

53.7 g of this filter cake were stirred with 110 ml of water, and 1.3 g of 98% strength by weight lithium hydroxide were added, the dye gradually dissolving. The resulting solution was clarified by filtration and was then directly ready for use. The solution, which had a pH of 10.2 and contained 12.5% by weight, based on the weight of the solution and calculated as free acid, of coumarin dye, was still stable at room temperature even after storage for several months.

EXAMPLE 2

53.7 g of the filter cake obtained in Example 1 were dissolved in 40 ml of water and 2.1 g of sodium hydroxide while stirring. The resulting solution of the dye had a long shelf life and a pH of 8.0 and contained 21.6% by weight, based on the weight of the solution and calculated as free acid, of coumarin dye.

EXAMPLE 3

The procedure was similar to that of Example 2, except that 100 ml of water and 4.5 g of 25% strength by weight aqueous ammonia solution were used. Once again, the resulting solution had a long shelf life and contained 13.0% by weight, based on the weight of the solution and calculated as free acid, of coumarin dye.

Solutions having long shelf lives are obtained in a similar manner if, instead of the aqueous ammonia solution, equivalent amounts of the following bases are used.

| Example No. | Base |
| --- | --- |
| 4 | Potassium hydroxide |
| 5 | Ethanolamine |
| 6 | Diethanolamine |
| 7 | Triethanolamine |
| 8 | N-Methylethanolamine |
| 9 | N,N-Dimethylethanolamine |
| 10 | N,N-Diethylethanolamine |
| 11 | 2-Aminopropan-1-ol |
| 12 | 2-N,N-Dimethylaminopropan-1-ol |

EXAMPLE 13 (use)

0.42 part of the dye solution from Example 2 was added to 50 parts of a mixture of 70% by weight of bleached pine sulfate pulp and 30% by weight of bleached birch sulfate pulp in 2000 parts of tap water, and the mixture was stirred for 5 minutes. 0.38 part of a 45% strength by weight commercial polymer of dicyandiamide, urea and formaldehyde was then added. Stirring was carried out for 10 minutes, after which a paper sheet was produced in the conventional manner on a Frank sheet former. The resulting greenish yellow, fluorescent dyeing had good light fastness and wet fastness, and the waste water from the dyeing process was only slightly colored.

EXAMPLE 14 (use)

An absorptive paper sheet produced from 70% by weight of bleached pine sulfate pulp and 30% by weight of bleached birch sulfate pulp was immersed in an aqueous dyeing solution containing 0.5% by weight of the dye preparation from Example 2 and was then dried. A greenish yellow dyeing of high brilliance was obtained.

we claim:

1. An aqueous paper stock dye preparation comprising a paper stock obtained from a paper pulp and from 0.01 to 1.5% by weight of a coumarin dye of the formula I

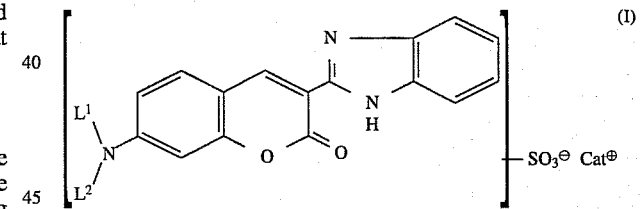

where $L^1$ and $L^2$, independently of one another, are each $C_1$–$C_4$-alkyl and $Cat^\oplus$ is an alkali metal ion or an ammonium ion of the formula

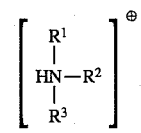

where $R^1$, $R^2$ and $R^3$, independently of one another, are each hydrogen, $C_1$–$C_4$-alkyl or $C_2$–$C_4$-hydroxyalkyl, based on the weight of dry paper pulp and pure dye, and an amount of water sufficient to dissolve said dye.

2. A dye preparation as claimed in claim 1, wherein $L^1$ and $L^2$ are each ethyl.

3. A dye preparation as claimed in claim 1, wherein $Cat^\oplus$ is a lithium, sodium or potassium ion.

4. A dye preparation as claimed in claim 1, containing from 12 to 25% by weight, calculated as free acid, of a coumarin dye.

5. A process for coloring paper stocks, comprising contacting a paper stock with an aqueous liquor comprising a coumarin dye of the formula I

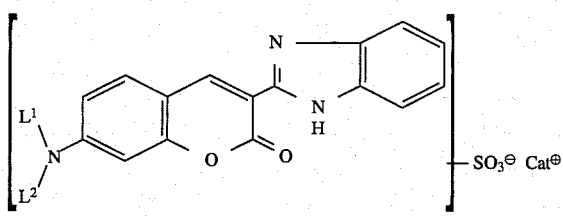

where $L^1$ and $L^2$, independently of one another, are each $C_1$–$C_4$-alkyl and $Cat^\oplus$ is an alkali metal ion or an ammonium ion of the formula

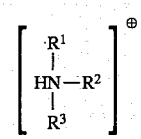

where $R^1$, $R^2$ and $R^3$, independently of one another, are each hydrogen, $C_1$–$C_4$-alkyl or $C_2$–$C_4$-hydroxyalkyl.

6. The process as claimed in claim 5, wherein $L^1$ and $L^2$ are each ethyl.

7. The process as claimed in claim 5, wherein $Cat^\oplus$ is a lithium, sodium or potassium ion.

8. The process as claimed in claim 5, wherein said aqueous liquor comprises from 12 to 25% by weight, calculated as free acid, of said coumarin dye.

9. The process as claimed in 5, wherein said aqueous liquor further comprises one or more cationic fixing agents.

* * * * *